March 24, 1959 S. E. MILLER 2,879,484

BRANCHING FILTER

Filed Feb. 11, 1953 3 Sheets-Sheet 1

INVENTOR
S. E. MILLER
BY H. O. Wright
ATTORNEY

March 24, 1959 S. E. MILLER 2,879,484

BRANCHING FILTER

Filed Feb. 11, 1953 3 Sheets-Sheet 2

INVENTOR
S. E. MILLER
BY H. O. Wright
ATTORNEY

INVENTOR
S. E. MILLER
BY
H. O. Wright
ATTORNEY

United States Patent Office 2,879,484

Patented Mar. 24, 1959

2,879,484

BRANCHING FILTER

Stewart E. Miller, Middletown, N.J., assignor to Bell Telephone Laboratories, Incorporated, New York, N.Y., a corporation of New York Application February 11, 1953, Serial No. 336,286

9 Claims. (Cl. 333—9)

This invention relates to very high frequency or microwave electrical transmission systems and, more particularly, to frequency-selective apparatus for segregating or branching wave energy of a given frequency or band of frequencies from one transmission system into another transmission system.

Frequency-selective apparatus or filter means have been essential components in electrical transmission systems since the very beginnings of the art. The usual filter may be described broadly as reactive components interposed in a transmission path which at certain frequencies have sufficient impedance match to the transmission path that wave energy at these frequencies is allowed to pass beyond the filter along the path, while energy at other frequencies encounters such an impedance mismatch that it is reflected back along the path. Another type of filter, which has been heretofore designated as a "constant resistance filter" or as a "branching filter," is a multibranch network which not only discriminates between wave energy of differing frequencies but separates the different frequencies into different paths or branches. Thus, power including a plurality of frequency components applied to one branch divides on the basis of frequency between two or more of the other branches with none being reflected back in the first branch. Because of this property, the circuit is used to branch or segregate one of a plurality of channels of multichannel wave energy.

It is an object of the present invention to branch or segregate wave energy of a predetermined frequency or band of frequencies from wave energy of other frequencies by improved and simplified apparatus.

It is a further object of the invention to transfer electromagnetic wave energy of a given frequency or band of frequencies from one transmission line into another transmission line without the use of reactive components.

In several aspects, the structures of the present invention, are similar to the structures of the directional coupler, a familiar component in high frequency and microwave transmission systems for which countless uses and applications have been described in the published art. In general, all presently known directional couplers are formed by a section of main transmission line coupled to a section of auxiliary line. The coupling between the two sections is arranged so that an electromagnetic wave traveling in a single direction along the main line induces a principal secondary wave, known as the forward wave, traveling in a single direction along the auxiliary line. Conversely, a wave traveling in the opposite direction in the main transmission line induces a principal secondary wave traveling in the opposite direction in the auxiliary line.

In most practical directional couplers there is also an induced or secondary wave traveling in the opposite direction from each forward wave, known as the backward wave. The forward and the backward waves are desirably greatly unequal in strength. Their relative strength is called the directivity of the coupler and is usually expressed as the decibel ratio of the forward wave current to the backward wave current. The strength of the desired induced forward wave in the auxiliary line to the inducing wave in the main line is called the "coupling loss" and is also expressed as the decibel ratio of the desired or forward induced wave to the inducing wave in the main line. This "coupling loss" is actually the transfer ratio between the two lines and there is no power dissipated in the structure. The performance of a directional coupler may be described in terms of this directivity and coupling.

Heretofore, the interest of the art has been primarily concerned with the directivity of the couplers. It has been shown that the directivity is frequency sensitive. While it is conceivable that useful advantage might be taken of this fact, it has usually been considered a disadvantage and substantial effort has been given to increasing the operating band over which a given value of directivity is maintained. In all known prior directional couplers, however, the forward coupling has been substantially independent of frequency, i.e., the desired induced forward wave bears a constant ratio to the inducing wave regardless of frequency except as the coupling means itself may have some incidental and uncontrollable frequency selectivity.

It is, therefore, in a further aspect, an object of the invention to obtain a determinable coupling versus frequency characteristic for directional couplers.

In accordance with the last-mentioned object, the phase constants of the main and auxiliary line of a usual directional coupler are modified in accordance with the invention so that the lines have different relative phase velocity versus frequency characteristics which characteristics intersect at a predetermined frequency. Energy at this frequency will be transferred from one line into the other to add in phase therein. Energy at other frequencies will experience destructive interference, however, in the second line. The directivity of the directional coupler as such is preserved and, in addition, the structure is given the frequency-selective characteristics of a branching filter.

One feature of the invention resides in control of the relative phase constants of coupled wave guides of the metallic shield type by choice of the respective dielectric and/or permeability constants and the cross-sectional dimensions of the guides. In one specific embodiment, it will be demonstrated how the effective dielectric constant of one guide may be made variable to provide a tunable branching filter. Other features of the invention reside in the control of phase constants in accordance with the invention in all-dielectric wave-guide systems and in combination systems of all-dielectric and shielded types of wave guides.

These and other objects and features, the nature of the present invention, and its various advantages, will appear more fully upon consideration of the various specific illustrative embodiments shown in the accompanying drawings and in the following detailed description of these drawings.

In the drawings:

Fig. 1 illustrates a specific embodiment of a frequency-selective coupled line branching circuit employing wave guides of the metallic shield type;

Fig. 2, given by way of explanation, shows the characteristic of the ratio of the wavelentgh in free space to the guide wavelength versus frequency for wave transmission lines of different parameters;

Fig. 3, given by way of explanation, represents the transfer amplitude versus frequency characteristic of the filter of Fig. 1;

Figures 4, 5:
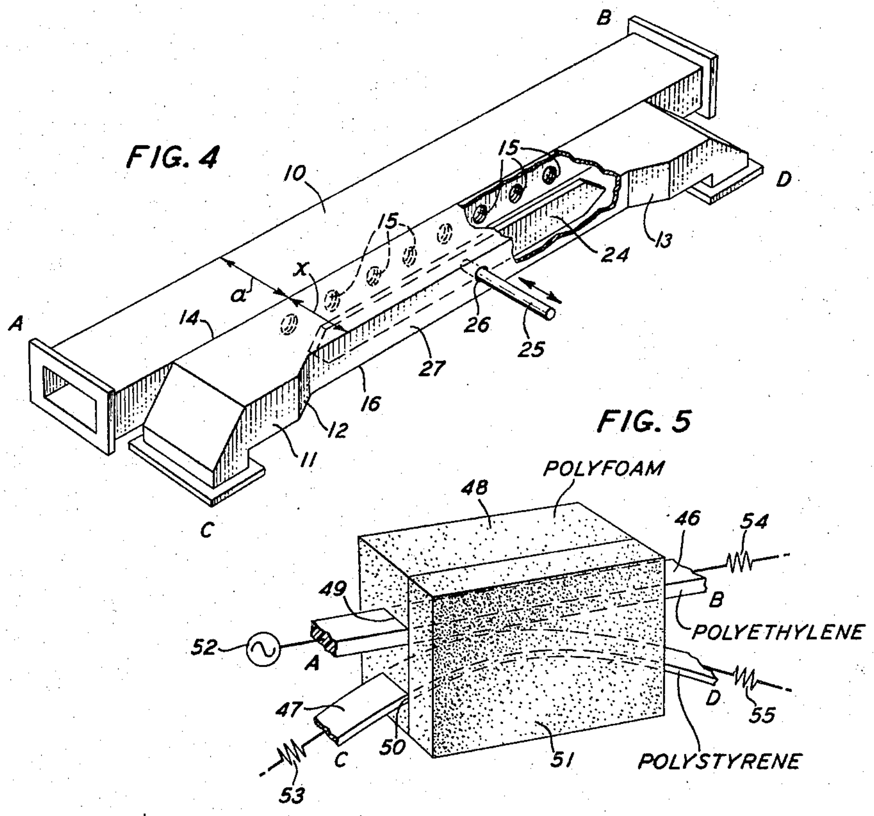
Fig. 4 illustrates a modification of the filter of Fig. 1 by means of which the filter is made tunable.
Fig. 5 illustrates a specific embodiment of a frequency-selective coupled line branching circuit employing all-dielectric type wave guides.
Figure 6:
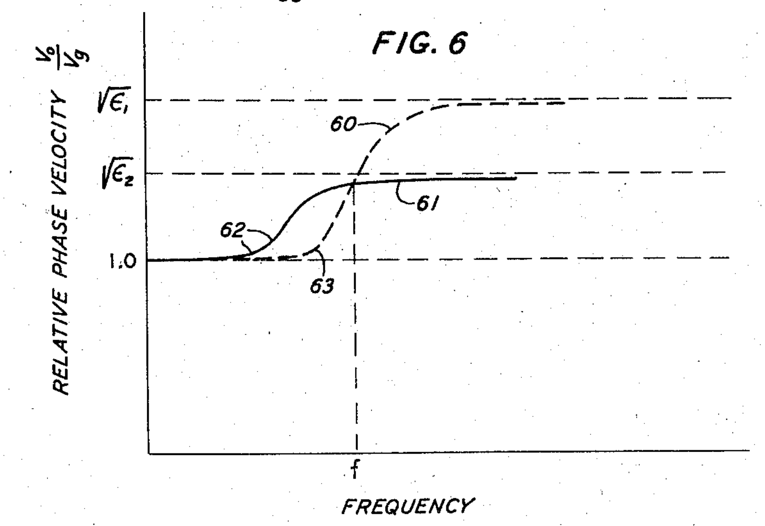
Figure 7:
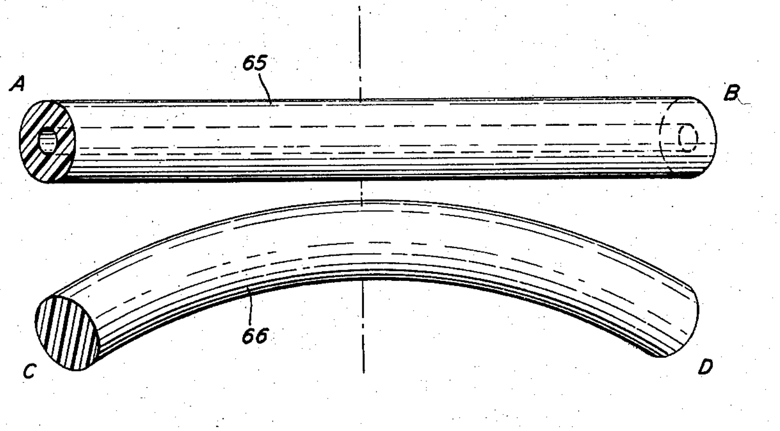
Figure 8:
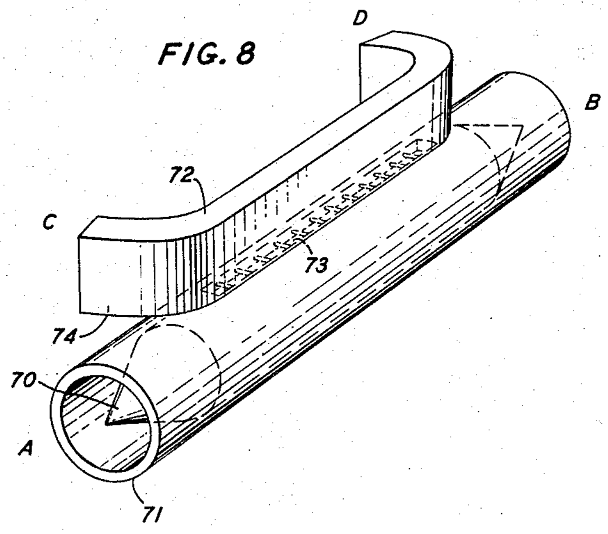

Fig. 6, given by way of explanation, shows the characteristic of the radio of the wavelength in free space to the guide wavelength versus frequency for the all-dielectric guides of Fig. 5;

Fig. 7 illustrates an alternative all-dielectric frequency-selective filter; and Fig. 8 illustrates a specific embodiment of a frequency-selective filter employing a combination of all-dielectric and shielded type wave guides.

Figures 1, 2, 3:
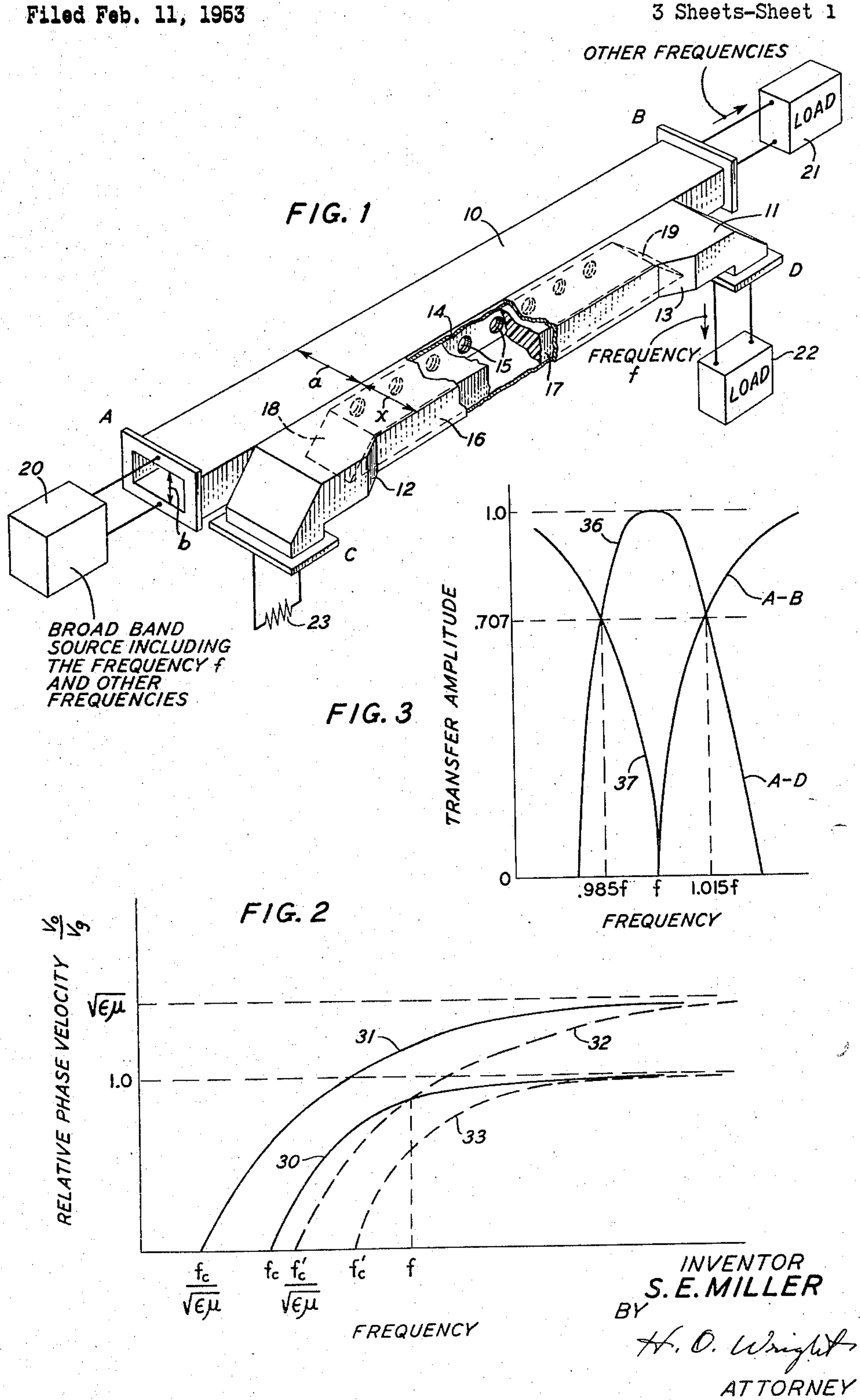

Referring more specifically to Fig. 1, a frequency-selective coupled line branching circuit is shown which may be used to segregate or branch on the basis of frequency one of a plurality of channels of multichannel wave energy. This circuit comprises a first section 10 of electrical transmission line for guiding wave energy, which may be a rectangular wave guide of the metallic shield type having a wide internal cross-sectional dimension *a* and a narrow dimension *b*. Located adjacent line 10 and running for a portion of its length substantially parallel thereto is a second section 11 of transmission line which, except for constricted portion 16, has cross-sectional dimensions similar to those of guide 10. In portion 16, the wider internal dimension of guide 11 is reduced by smooth tapers 12 and 13 to a dimension *x*. Lines 10 and 11 are coupled in constricted portion 16 over an interval of several wavelengths by one of the several broad band coupling means familiar to the directional coupler art. This coupling means may be, as illustrated, a common wall 14 between lines 10 and 11 having a plurality of apertures 15 therein distributed at intervals of less than one-half wavelength along constricted portion 16. Line 10 is illustrated as being air filled. The constricted portion 16 of guide 11, however, is filled or partially filled with material having a different permeability constant and/or different dielectric constant from that of air. As illustrated, guide 11 may be filled in constricted portion 16 by a member 17 of composition to be noted hereinafter which may have cross-sectional dimensions substantially the same as the internal dimensions of the guide 11 in portion 16. Member 17 may be smoothly tapered at each of its ends 18 and 19 to avoid undue reflections therefrom.

It is, therefore, observed that guides 10 and 11 in the region of coupling have different cross-sectional dimensions and different dielectric and/or permeability constants which provide them with different cut-off wavelengths, phase constants, relative phase velocity versus frequency characteristics, and guide wavelength versus frequency characteristics. In accordance with the present invention, the relative cross-sectional dimensions of lines 10 and 11 are adjusted relative to their respective phase constants so that the phase velocity versus frequency characteristics (and, therefore, the guide wavelength versus frequency characteristics) of the two lines intersect for a predetermined frequency of wave energy. Wave energy in the two lines in the region of coupling will have equal phase velocities and equal guide wavelengths in the range of this predetermined frequency only, but unequal phase velocities and unequal guide wavelengths at all other frequencies. This adjustment will be examined more critically hereinafter with reference to Fig. 2. First, however, it may be briefly stated that at the predetermined frequency, components of the incident wave energy in one of the lines will be coupled through each of the plurality of apertures 15 into the other line and add in phase therein. Energy at other frequencies at which the guide wavelengths are not equal will experience destructive interference between the several components transmitted through apertures 15.

Referring now to Fig. 2, the relative phase velocities, or more specifically, the ratio of the wave velocity in free space $V_0$ to the guide velocity $V_g$ is plotted against frequency for wave transmission lines of different parameters. As is well known, the cut-off frequency of a wave-guide transmission line is determined by its dielectric and/or permeability constant and by its physical dimensions (in the particular case of a dominant mode rectangular wave guide by the wider wall dimension). In Fig. 2, the value $f_c$ represents the cut-off frequency of a guide having substantially unity dielectric and permeability constants, such as an evacuated guide or one filled with air or other inert gas, and having a first value of wide dimension. Curve 30 represents the variation in the ratio $$\frac{V_0}{V_g}$$

versus frequency which rises from zero at $f_c$ to approach unity as the frequency is increased. As the wider dimension of the guide is decreased, the cut-off frequency is increased to a value $f_c'$. Curve 33 represents the ratio $$\frac{V_0}{V_g}$$

versus frequency for a guide with this second value of wide dimension. When the guide of either cross-section is filled with a material having a relative dielectric constant which is greater than unity, for example, a constant of $\epsilon$ and a relative permeability constant of $\mu$, also greater than unity, the cut-off frequency is reduced by the factor $$\frac{1}{\sqrt{\epsilon\mu}}$$

The shifted cut-off frequency values are indicated on Fig. 2 for guides of both the first and second cross-sectional dimensions. A corresponding pair of curves 31 and 32, respectively, represent the variation of the ratio $$\frac{V_0}{V_g}$$

as frequency is increased. In each case the ratio rises from zero at the respective cut-off frequency to approach the quantity $\sqrt{\epsilon\mu}$ as the frequency is increased.

In accordance with one specific embodiment of the invention shown in Fig. 1, transmission line 10 is filled with air and given a wide dimension *a* so that it operates with the relative phase velocity versus frequency characteristic of curve 30. Line 11 is designed to operate with the characteristic of curve 32 in the region of coupling by the choice of its dielectric and permeability constants and its cross-sectional dimensions. The dielectric and permeability constants of line 11 are controlled by the choice of the composition of member 17 which may have high dielectric and low permeability constants in which case, member 17 may be a block of polystyrene or other plastic dielectric material. In accordance with another embodiment of the invention, member 17 may be a block of ferromagnetic material or like substance having a high permeability constant and a low dielectric constant. It may also be made of a material having both high dielectric and permeability constants. It should be noted that line 10 may also be filled with a material having dielectric and/or permeability constants different from those of air so long as the product $\sqrt{\mu_0\epsilon_0}$ for line 10 differs from the value of $\sqrt{\mu\epsilon}$ for line 11.

Having selected the dielectric and/or permeability materials for the coupled guides, the frequency $f$ at which curves 30 and 32 intersect and at which the guide wavelength in guide 11 is equal to the guide wavelength in guide 10 is selected by choice of the relative cross-sectional dimensions of guides 10 and 11. Assuming for illustration that guide 10 has dielectric and permeability constants $\epsilon_0$ and $\mu_0$, respectively, and that guide 11 is filled in portion 16 with a material of dielectric constant $\epsilon$ and permeability constant $\mu$, the guide wavelength in line 11 for frequency $f$ at which the free space wavelength is $\lambda_0$ is given by $$\lambda_{g_{11}}=\frac{\lambda_0}{\sqrt{\epsilon\mu-\left(\frac{\lambda_0}{2x}\right)^2}} \quad (1)$$

and the guide wavelength in line 10 by $$\lambda_{g_{10}}=\frac{\lambda_0}{\sqrt{\epsilon_0\mu_0-\left(\frac{\lambda_0}{2a}\right)^2}} \quad (2)$$

The guide wavelengths at frequency $f$ are equal when the $x$ dimension of guide 11 is equal to $$x=\frac{a}{\sqrt{1+\frac{4a^2}{\lambda_0^2}(\epsilon\mu-\epsilon_0\mu_0)}} \quad (3)$$

Thus, a broad band signal containing the frequencies of several channels including the frequency $f$ to be branched may be applied to one terminal, for example, as illustrated by source 20 connected to terminal A of line 10 of the filter of Fig. 1. In a typical microwave transmission system, each of the channels will have a relatively broad band width and the center frequency of each channel will be frequency spaced from the next adjacent channel by at least the band width of each channel. The intelligence bearing signals in each channel may comprise a pair of signal sidebands produced by modulating a carrier signal of frequency approximating the mid-band frequency of the channel with the intelligence signal by any of the well-known modulation methods. For the purposes of the following discussion, a channel will be designated by the frequency of the mid-band component or the carrier frequency, including in this designation the energy components surrounding the carrier frequency.

As the energy of channel $f$ travels along guide 10, portions of it will be successively transferred into guide 11 by coupling apertures 15. So far as transmission of this energy in guide 11 in the backward direction toward terminal C is concerned, the structure is inherently a directional coupler, i.e., a minimum transmission of energy in the backward direction in guide 11 will be found since the collective effect of a large number of discrete coupling elements spaced at less than one-half wavelength apart is of itself directionally selective as is well known in the directional coupler art. Any of the many distributions for a plurality of discrete points known to the art may, in addition, be used to improve the directivity or to increase the band width over which a given directivity is maintained. A number of these distributions are collected and analyzed in an article "Directive Coupler in Wave Guides," by M. Surdin in 93 Journal of the Institution of Electrical Engineers, part IIIA, 1946, at page 725, any of which are suitable for the purposes of the present invention. Substantially distributed coupling may also be used by employing the divided aperture type of coupling fully described and claimed in the copending application of A. G. Fox, Serial No. 236,556, filed July 13, 1951, now United States Patent 2,701,342, issued February 1, 1955, and in my copending application Serial No. 216,132, filed March 17, 1951, now United States Patent 2,701,340, issued February 1, 1955.

The present invention is concerned primarily with transmission of energy in the forward direction toward terminal B of guide 10 and terminal D of guide 11. Energy of all frequencies is transferred through the first coupling aperture 15 from line 10 to line 11 and experiences in this transfer a 90 degree phase delay. This energy travels to the right in guide 11 to the second aperture, whereby part of it is returned to line 10 with a further delay of 90 degrees. Thus, at the frequency $f$, and substantially so for a band adjacent to the frequency $f$, the energy which goes from line 10 to line 11 and back to line 10 by way of a later aperture, arrives in line 10 out of phase with the frequency $f$ energy which travels straight through line 10. On the other hand, all components in line 11 are in phase. A summation of such components eventually results in cancellation of the channel $f$ energy in line 10 and the transfer thereof into line 11. As to the energy of other frequencies, no corresponding cancellation and transfer results since the guide wavelengths in the two lines are different and the necessary in-phase and out-phase relationships do not exist.

The resulting transmission characteristic is represented by the transfer amplitude versus frequency characteristic of Fig. 3. Curve 36 represents the energy applied at terminal A of line 10 which appears at terminal D of line 11 and curve 37, the energy applied at terminal A which appears at terminal B of line 10. At the frequency $f$ the greater portion of the energy is transferred to terminal D and delivered to load 22, the remainder being sent to terminal B and delivered to load 21. No appreciable power introduced at A will appear at C because of the directional nature of the coupling described above. The exact ratio of the power division at the frequency $f$ between terminals B and D is determined by the integrated coupling strength factor dependent upon the strength and distribution of the coupling between lines 10 and 11, as described in detail in my copending application Serial No. 325,488, filed December 11, 1952. As there disclosed, this factor is expressed $$n \sin^{-1} C \quad (4)$$

in which $n$ represents the number of discrete coupling points, and C the coupling factor of each of these points. All the power at the frequency $f$ is transferred to terminal D when this quantity is equal to $$\frac{m\Pi}{2}$$

where $m$ is any odd integer. Lesser ratios are transferred for smaller fractions of $\Pi$. As the frequency of the wave energy aplied to terminal A is changed, the guide wavelengths in the two guides become different and the energy transferred to terminal D falls off while the fraction of energy going to terminal B rises to the full value of the applied energy at A. Still no power is transmitted from terminal A to terminal C.

The curves of Fig. 3 are typical of a specific embodiment. It is thus seen that the "half power" points or the points at which the amplitude in each of the lines is 0.707 of the maximum amplitude occur at frequencies about 1.5 percent above and below the center frequency $f$. Beyond these points the frequency discrimination increases very rapidly. Thus, a band pass or band elimination characteristic is obtained having a band width of about 3 percent of the operating frequency. Obviously, this band width may be increased by varying any of the parameters of the lines that will result in decreasing the sharpness with which characteristics 30 and 32 of Fig. 2 intersect. Conversely, the band width may be decreased by increasing the acute angle between curves 30 and 32.

It should be noted that the channel branching circuit of Fig. 1 is bilateral and symmetrical. Thus, if several channels including the channel $f$ are applied to the B terminal, channel $f$ will be branched into the C terminal and the remaining channels passed to the A terminal. Channels may be applied simultaneously to the A and B terminals without interaction in view of the balanced condition of the wave-guide branching structure. Conversely, if channel $f$ were applied to terminal C and the other channels to terminal A, the signals would all be combined at terminal B. If, in a particular arrangement, one or more of the terminals are not employed, they may be connected to a non-reflecting termination such as termination 23 on terminal C.

Several branching circuits of the types shown in Fig. 1 may be connected in cascade, each adapted to branch or to combine a successively different one of a plurality of channels. In general, therefore, a branching circuit such as that shown in Fig. 1 may replace the hybrid branching filters in systems employing particular channel arrangements of known channel branching or dropping filters, such for example, as disclosed by W. D. Lewis and L. C. Tillotson in an article, "A Non-Reflecting Branching Filter for Microwaves," published in the Bell System Technical Journal, January 1948, vol. 27, pages 83 through 95, or as disclosed in United States Patent 2,531,447, granted to W. D. Lewis, November 28, 1950; United States Patent 2,561,212, granted to W. D. Lewis, July 17, 1951; and 2,531,419, granted to A. G. Fox, November 28, 1950.

Fig. 4 illustrates a tunable modification of the filter of Fig. 1 by which the frequency of the selected signal may be varied or adjusted at will. The structure of Fig. 4 is similar to that of Fig. 1 and corresponding reference numerals have been used to designate corresponding components. In portion 16, however, of Fig. 4 there is located a flat elongated vane 24 of dielectric and/or permeable material extending the length of portion 16 across the narrow dimension of guide 11. The thickness of vane 24 is a fraction, for example, one-fifth to one-tenth of the wide dimension of portion 16. Vane 24 is fastened to the end of rod 25 which extends through an aperture 26 in the wall 27 of portion 16 so that vane 24 may be moved transversely across portion 16. When vane 24 is at the center of portion 16 its effect will be greatest on the dielectric and permeability constants of line 11. In this position the characteristic of line 11 is suitably represented by curve 32 of Fig. 2. As vane 24 is moved from its center position toward either narrow wall of portion 16, the effective dielectric constant of the line is descreased. Thus, the maximum value of curve 32 and the cut-off frequency for this characteristic are decreased. This causes the intersection of curve 32 and curve 30, and therefore, the selected frequency $f$, to move to higher frequency values. The dimension $x$ is chosen to select the middle frequency of the variable range by substituting for $\epsilon\mu$ in Equation 3 above, the average dielectric and permeability constants of line 11.

The principles of the present invention are by no means limited to shielded transmission lines, either wave guide or coaxial, but may likewise be applied to other forms of electrical transmission lines including open wire lines. In particular, they may be applied to the all-dielectric wave couplers as disclosed in the copending application of A. G. Fox, Serial No. 274,313, filed March 1, 1952, now United States Patent 2,794,959, issued June 4, 1957. As there disclosed, electromagnetic wave energy, when properly launched upon a strip or rod of all-dielectric material, i.e., a rod without a conductive shield, will be guided by the strip or rod with a portion of the energy conducted in a field surrounding the strip. These strips or rods may be of any material having a dielectric constant substantially different from that of air or that of free space, and, therefore, having a phase velocity for wave energy substantially different from the phase velocity of energy in free space. For example, these strips may be made of polystyrene, polyethylene or Teflon, to mention only several specific materials.

Referring to Fig. 5, an all-dielectric wave-guide branching filter is shown. This filter includes a main transmission path which can be a straight strip 46 of all-dielectric wave guide of the type hereinbefore described and an auxiliary transmission path which can be a smoothly curved portion of a strip 47 of similar material which arches into proximate relation to a portion of strip or guide 46. Guide 46 is given slightly larger cross-sectional dimensions than guide 47 and is made from a material having a slightly lower dielectric constant than the material of guide 47. Several combinations of dielectric material may be satisfactory. For specific example, however, guide 46 may be made of polyethylene and guide 47 of polystyrene. Thus, guide 46 and guide 47 have equal propagation velocities for electromagnetic wave energy at one frequency only and different velocities at other frequencies, as will be described in detail hereinafter. As illustrated, the transverse dimensions of the wider faces of strips 46 and 47 are parallel, but obviously, they may bear any convenient relation to each other.

While guides 46 and 47 may be held in this relative position in numerous ways, Fig. 5 illustrates one particular means comprising a block 48 of any material having a low loss and a low dielectric constant substantially close to that of air and, therefore, substantially different from the dielectric constant of the material of guides 46 and 47. Block 48 has a straight slot 49 therein into which guide 46 is pressed and a curving slot 50 into which guide 47 is pressed. A suitable substance for block 48 is foamed polystyrene material. A sheet 51 of similar material may be suitably fastened across the slotted face of block 48. The forward and backward ends of both the main and auxiliary paths may be coupled by horns to related metallic wave-guide systems and the device of Fig. 5 can then serve therein the functions described above for the filter of Fig. 1. Such connections are repsented schematically on Fig. 5 by a source of signal energy 52 coupled to the backward end of guide 46, useful loads 54 and 55 coupled to the forward ends of guides 46 and 47, respectively, and by matched load 53 coupled to the backward end of guide 47.

As pointed out hereinbefore, a substantial amount of wave power is carried in the space surrounding each guide, and particularly so, if the cross-sectional dimensions of guides 46 and 47 are small compared to the wavelength of energy propagated thereover. Thus, when guides 46 and 47 are brought into proximate physical relationship, the fields carried by the guides interact to produce electromagnetic coupling between the two dielectric paths. The amplitude of this coupling is inversely proportional to the distance between the guides. Therefore, the physical relationship between guides 46 and 47 produces a distributed and tapered coupling which gradually decreases from maximum coupling at the center of the coupling region to an infinitesimal coupling at points where the guides are separated by a larger amount.

The operation of the all-dielectric embodiment of Fig. 5 is a very similar to the operation of the wave-guide embodiment of Fig. 1. This operation may most readily be understood by reference to the characteristics of Fig. 6 which in a general way correspond to the characteristics of Fig. 2 hereinbefore considered.

Referring to Fig. 6, the relative phase velocities of guides 46 and 47 of Fig. 5 are illustrated by the characteristics of the ratio of the free space wave velocity $V_0$ to the guide wave velocity $V_g$ versus frequency for each guide. Curve 61 represents the characteristic of guide 46 which starts at the ratio value of one, remains essentially constant as frequency is increased until region 62 is reached, and then rises to approach the square root of $\epsilon_2$, representing the dielectric constant of the polyethylene of guide 46. Curve 60 represents the characteristic of guide 47 which similarly starts at the ratio value of one, remains constant until the region 63 is reached, and then rises to approach the square root of the dielectric constant $\epsilon_1$ (higher than $\epsilon_2$) of the polystyrene of guide 47. The frequencies at which regions 62 and 63 occur are rather complicated functions of the cross-sectional dimensions of guides 46 and 47, respectively, but it may be stated qualitatively that the frequency at which either of these regions occur increases as the cross-sectional area of the particular guide is decreased. Therefore, the relative cross-sectional areas are chosen to select the frequency $f$ at which the characteristics 60 and 61 intersect. As in the wave-guide embodiment of Fig. 1, only wave energy at the frequency $f$ will be transferred from one guide into the other. The transfer amplitude versus frequency characteristic of Fig. 3, therefore, represents the division of power, applied as illustrated from source 52 to terminal A of guide 46, between terminals B and D. No power is transferred to the C terminal because of the inherent directivity of the structure.

Fig. 7 illustrates an all-dielectric frequency-selective filter in which the two coupled lines are made of the same materials, but because one is solid and the other is hollow, they have unequal effective dielectric constants. Thus, in Fig. 7 a main transmission path comprises a straight, hollow pipe or tube 65 of dielectric material. A smoothly curved solid rod 66 of the same material arches into coupling relation with tube 65 and constitutes the auxiliary transmission path. The effective dielectric constant, in so far as it affects the phase velocity of wave energy propagated along the hollow rod 65, is lower than that of solid rod 66. Rods 65 and 66 are supported in this relative position by suitable means, which means may be similar to the supporting means of Fig. 5.

Thus, the relative phase velocity of rod 65 is satisfactorily represented by curve 61 of Fig. 6 and that of rod 66 by curve 60. The relative cross-sectional dimensions of rods 65 and 66 are selected to choose the frequency $f$ at which characteriestics 60 and 61 intersect and thereby to determine the frequency of wave energy which may be coupled between the lines because of equal phase velocities and guide wavelengths at this frequency. The transfer amplitude versus frequency characteristics of Fig. 3, therefore, represent the division of power when applied to terminal A of guide 65, between terminals B and D. No power is transferred to the C terminal because of the inherent directivity of the structure.

While the principles of utilizing different effective dielectric constants obtained by employing dielectric guides of the same material but with different degrees of hollowness, has been illustrated with rods of substantially circular cross-section in Fig. 7, it should be apparent that these principles also apply to dielectric guides of other cross-sections. In particular, the rectangular guides of Fig. 5 could be made of the same material but with a portion of the center removed from one to decrease its effective dielectric constant relative to the other.

Referring to Fig. 8, an embodiment of the principles of the invention employing a combination of a metallic shielded transmission line 71 and an all-dielectric transmission line 72 is shown. Line 71 is illustrated as a metallic wave guide of circular cross-section. It is coupled to all-dielectric guide 72 by a divided aperture 73, of the type described in the copending applications mentioned above, in the wall of guide 71. A flattened face 74 of guide 72 extends longitudinally over aperture 73. In the region of coupling, metallic guide 71 is filled with a dielectric member 72 which may be conically tapered at each of its ends to prevent reflection therefrom.

The operation of the filter of Fig. 8 may be easily understood by referring jointly to the characteristics of Figs. 2 and 6. Since dielectric filled metallic guide 71 operates upon a relative phase velocity characteristic similar to curve 31 of Fig. 2 and all-dielectric guide 72 upon a characteristic similar to curve 61 of Fig. 6, it may be seen that at least two possibilities exist for producing an intersection of the curves for a predetermined frequency. If the cross-sectional dimensions of guide 72 are relatively large and those of guide 71 relatively small, the characteristics will intersect at only one frequency. However, if the cross-sectional dimensions of guide 72 are smaller and those of guide 71 larger, the curves may intersect in two regions, i.e., one at a frequency below region 62 of Fig. 6 and one at a frequency above. Thus, a filter having two frequency ranges may be obtained which may be either band pass or band elimination.

Another factor that must be kept in mind with regard to the embodiment of Fig. 8 stems from the possibility that a guide such as guide 71 may be capable of supporting several modes of wave energy propagation, each of which will have different phase velocities and guide wavelengths. As disclosed in detail in my copending application for patent for "High Frequency Selective Mode Transducer," Serial No. 245,210, filed September 5, 1951, now United States Patent 2,748,320, issued May 29, 1956, wave energy will be transferred between differing modes of propagation in two coupled lines only when these modes have equal phase velocities. Therefore, it is assumed in the above discussion that the relative phase velocity versus frequency characteristic considered for guide 71 is that of a particular mode. The apparatus of Fig. 8 is, therefore, not only frequency-selective but also mode selective. The principles of the present invention may also be applied to each of the mode transducer structures disclosed in said last-mentioned copending application so that wave energy of a predetermined frequency and also in a predetermined mode may be transferred from one guide into another. Conversely, wave energy of a predetermined frequency may be selected from one guide and launched in a predetermined mode in the second guide.

For example, if in Fig. 8 guide 72 is taken to represent a rectangular shielded transmission line which may be filled with dielectric material and the relative phase velocity characteristic of curve 32 of Fig. 2 is taken to represent this characteristic for the dominant $TE_{10}$ mode therein, while the curve 30 of Fig. 2 represents the relative phase velocity of the $TE_{01}$ or circular electric mode in round guide 71, then a frequency-selective mode transducer in accordance with the present invention will be obtained which corresponds to the broad band mode transducer of Fig. 1 of said last-mentioned copending application.

In all cases, it is understood that the above-described arrangements are simply illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. The combination comprising a first metallic shield transmission line having a first maximum cross-sectional dimension, a second metallic shield transmission line having a second maximum cross-sectional dimension, said dimension of said second line being smaller than said dimension of said first line, said first line being coupled at a plurality of points to said second line, and a member of material having a dielectric constant greater than the dielectric constant of said first line inserted in said second line in the vicinity of said plurality of coupling points.

2. The combination according to claim 1, wherein the position of said member in said second line is variable whereby its effect upon the phase velocity versus frequency characteristic of said second line is variable.

3. The combination according to claim 1, wherein each of said coupling points couples a fraction C of the wave energy in one line into the other and wherein the number of said plurality of points is equal to $$\frac{m\Pi}{\sin^{-1} C}$$

where $m$ is any odd integer.

4. A frequency-selective wave coupling system comprising a first rectangular wave guide having a wide internal dimension $a$, a permeability constant $\mu_0$ and a dielectric constant $\epsilon_0$, a second rectangular wave guide having a permeability constant $\mu$ and a dielectric constant $\epsilon$, the product of said constants of said first guide being different from the product of said constants for said second guide, means directionally coupling said lines over a longitudinal portion of their lengths, said second wave guide having a wide internal dimension equal to $$\frac{a}{\sqrt{1+\frac{4a^2}{\lambda_0^2}(\epsilon\mu-\epsilon_0\mu_0)}}$$

wherein $\lambda_0$ is the free space wavelength of wave energy to be selected by said system.

5. A frequency-selective wave coupling system comprising first and second strips of all-dielectric material, each of said strips constituting an electromagnetic wave energy path in which a substantial portion of wave power is conveyed in a field surrounding the strip, said strips being in proximate physical relationship over a portion of their lengths, said members having intersecting phase velocity versus frequency characteristics for electromagnetic wave energy conveyed therealong.

6. The combination according to claim 5, wherein said strips are of materials having different dielectric constants and are of different cross-sectional dimensions, whereby said intersecting characteristics are obtained.

7. The combination according to claim 5, wherein one of said strips is hollow and wherein said strips are of different external cross-sectional dimensions, whereby said intersecting characteristics are obtained.

8. A frequency-selective wave coupling system comprising a first electromagnetic wave energy transmission line having a first phase velocity versus frequency characteristic and having given dielectric and permeability constants, a second electromagnetic wave energy transmission line having a second phase velocity versus frequency characteristic and having dielectric and permeability constants, and means coupling said lines over a longitudinal portion of their lengths, said second line having a cut-off frequency in said portion different from the cut-off frequency of said first line in said portion, the product of said dielectric and permeability constants of said second line in said portion being different from the corresponding product of said first line in said portion, the cut-off frequency of the line which has the smaller product of dielectric and permeability constants being lower in said coupling portion than the cut-off frequency of the line which has the greater product of said constants, whereby said first phase velocity versus frequency characteristic intersects said second characteristic at one frequency and wave energy is transferred between said lines at said one frequency.

9. A frequency-selective wave coupling system comprising a first electromagnetic wave energy transmission line having a first phase velocity versus frequency characteristic and having given dielectric and permeability constants, a second electromagnetic wave energy transmission line having a second phase velocity versus frequency characteristic and having dielectric and permeability constants, and means coupling said lines over a longitudinal portion of their lengths, said first line having a larger maximum cross-sectional dimension than the maximum cross-sectional dimension of said second line in said portion, said first line having a smaller product of its dielectric and permeability constants than the corresponding product for said second line along said coupled portion, whereby said first phase velocity versus frequency characteristic intersects said second characteristic at one frequency and wave energy is transferred between said lines at said one frequency.

References Cited in the file of this patent

UNITED STATES PATENTS

| | | |
|---|---|---|
| 2,588,832 | Hansell | Mar. 11, 1952 |
| 2,609,450 | Early | Sept. 2, 1952 |
| 2,615,982 | Zaslavsky | Oct. 28, 1952 |
| 2,617,880 | Iams | Nov. 11, 1952 |
| 2,632,809 | Riblet | Mar. 24, 1953 |
| 2,636,116 | Taylor | Apr. 16, 1953 |
| 2,741,744 | Driscoll | Apr. 10, 1956 |

FOREIGN PATENTS

| | | |
|---|---|---|
| 964,637 | France | Feb. 1, 1950 |